US012790873B2

(12) United States Patent
Singh et al.

(10) Patent No.: US 12,790,873 B2
(45) Date of Patent: Nov. 10, 2026

(54) DOOR CONTROL MECHANISM

(71) Applicant: Rivian IP Holdings, LLC, Plymouth, MI (US)

(72) Inventors: Rajeev Kumar Singh, Dublin, OH (US); Marcus Merideth, Westland, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 821 days.

(21) Appl. No.: 17/891,451

(22) Filed: Aug. 19, 2022

(65) Prior Publication Data

US 2024/0060351 A1 Feb. 22, 2024

(51) Int. Cl.
*E05F 15/635* (2015.01)
*E05F 15/655* (2015.01)

(52) U.S. Cl.
CPC .......... *E05F 15/635* (2015.01); *E05F 15/655* (2015.01); *E05Y 2201/22* (2013.01); *E05Y 2201/224* (2013.01); *E05Y 2201/624* (2013.01); *E05Y 2201/686* (2013.01); *E05Y 2400/652* (2013.01); *E05Y 2900/531* (2013.01)

(58) Field of Classification Search
CPC ..... E05F 15/635; E05F 15/655; E05F 15/657; E05B 77/245; E05B 77/32; E05Y 2201/22; E05Y 2201/224; E05Y 2201/624; E05Y 2201/686; E05Y 2400/652; E05Y 2900/531
USPC .......................................................... 292/289
See application file for complete search history.

(56) References Cited

U.S. PATENT DOCUMENTS

| | | | | |
|---|---|---|---|---|
| 8,783,742 B2 * | 7/2014 | Puscas | E05B 77/06 292/336.3 |
| 9,970,221 B2 * | 5/2018 | Rudraraju | E05B 77/06 |
| 11,725,448 B2 * | 8/2023 | Choi | E05B 81/16 49/362 |
| 2004/0160066 A1 * | 8/2004 | Fisher | F16H 21/06 292/196 |
| 2016/0194910 A1 * | 7/2016 | Pellegrini | E05D 15/0686 49/362 |
| 2017/0136857 A1 * | 5/2017 | Hiramoto | E05B 77/265 |

(Continued)

FOREIGN PATENT DOCUMENTS

| | | | |
|---|---|---|---|
| CN | 114135171 A * | 3/2022 | E05B 79/22 |
| EP | 2644808 A1 * | 10/2013 | E05B 79/06 |
| EP | 3029230 A1 * | 6/2016 | E05B 77/30 |

*Primary Examiner* — Kristina R Fulton
*Assistant Examiner* — James Edward Ignaczewski
(74) *Attorney, Agent, or Firm* — Foley & Lardner LLP

(57) ABSTRACT

An apparatus can include a door control mechanism that defines a cavity. The door control mechanism can include an actuator body comprising a contact surface. The door control mechanism can include a projection that extends from the actuator body into the cavity. The apparatus can include a spacer to be disposed in the cavity. The spacer can include a spacer body, a first stopper, and a second stopper. The first stopper can extend from the spacer body. The first stopper can interface with the contact surface of the actuator body. The second stopper can extend from a surface of the spacer body. The second stopper can interface with the projection of the door control mechanism. At least one of the first stopper and the second stopper can prevent the door control mechanism from actuating in response to a manual force.

13 Claims, 9 Drawing Sheets

(56) References Cited

U.S. PATENT DOCUMENTS

| | | | | |
|---|---|---|---|---|
| 2017/0183893 | A1 * | 6/2017 | Yamashita | E05B 77/245 |
| 2017/0268277 | A1 * | 9/2017 | Thiele | E05F 11/54 |
| 2022/0034128 | A1 * | 2/2022 | Hiramoto | E05B 77/265 |

* cited by examiner

DOOR CONTROL MECHANISM

INTRODUCTION

Vehicles can have doors to allow for ingress to and egress from the vehicle.

SUMMARY

Vehicle doors that can be either manually operated or power operated. A door control mechanism installed to facilitate manual operation of the door can be different than a door control mechanism installed to facilitate power operation of the door. The disclosed solutions have a technical advantage of using a spacer to convert a manually operated door to a power operated door. For example, a door control mechanism can be manually operated when the spacer is not disposed in a cavity of the door control mechanism, and the door control mechanism can be power operated when the spacer is disposed in the cavity. As such, instead of manufacturing and installing separate systems for separate operating states, the same system can be used for both manual and power operation.

At least one aspect is directed to an apparatus. The apparatus can include a door control mechanism that defines a cavity. The door control mechanism can include an actuator body comprising a contact surface. The door control mechanism can include a projection that extends from the actuator body into the cavity. The apparatus can include a spacer to be disposed in the cavity. The spacer can include a spacer body, a first stopper, and a second stopper. The first stopper can extend from the spacer body. The first stopper can interface with the contact surface of the actuator body. The second stopper can extend from a surface of the spacer body. The second stopper can interface with the projection of the door control mechanism. At least one of the first stopper and the second stopper can prevent the door control mechanism from actuating in response to a manual force.

At least one aspect is directed to a method. The method can include inserting a spacer into a cavity defined by a door control mechanism. The door control mechanism can include an actuator body. The spacer can include a spacer body to be disposed in the cavity. The spacer can include a first stopper that extends from the spacer body. The spacer can include a second stopper that extends from a surface of the spacer body. The method can include interfacing the actuator body of the door control mechanism with at least one of the first stopper and the second stopper to prevent manual actuation of the door control mechanism.

At least one aspect is directed to a system. The system can include a door control mechanism to couple with a door. The door control mechanism can define a cavity. The door control mechanism can include an actuator body and a projection. The actuator body can include a contact surface. The projection can extend from the actuator body into the cavity. The system can include a spacer to be disposed in the cavity. The spacer can prevent manual actuation of the door control mechanism. The spacer can include a spacer body and a stopper. The stopper can extend from the spacer body. The stopper can be configured to interface with at least one of the contact surface and the projection to prevent the manual actuation of the door control mechanism.

At least one aspect is directed to a vehicle. The vehicle can include a door control mechanism that defines a cavity. The door control mechanism can include an actuator body comprising a contact surface. The door control mechanism can include a projection that extends from the actuator body into the cavity. The apparatus can include a spacer to be disposed in the cavity. The spacer can include a spacer body, a first stopper, and a second stopper. The first stopper can extend from the spacer body. The first stopper can interface with the contact surface of the actuator body. The second stopper can extend from a surface of the spacer body. The second stopper can interface with the projection of the door control mechanism. At least one of the first stopper and the second stopper can prevent the door control mechanism from actuating in response to a manual force.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
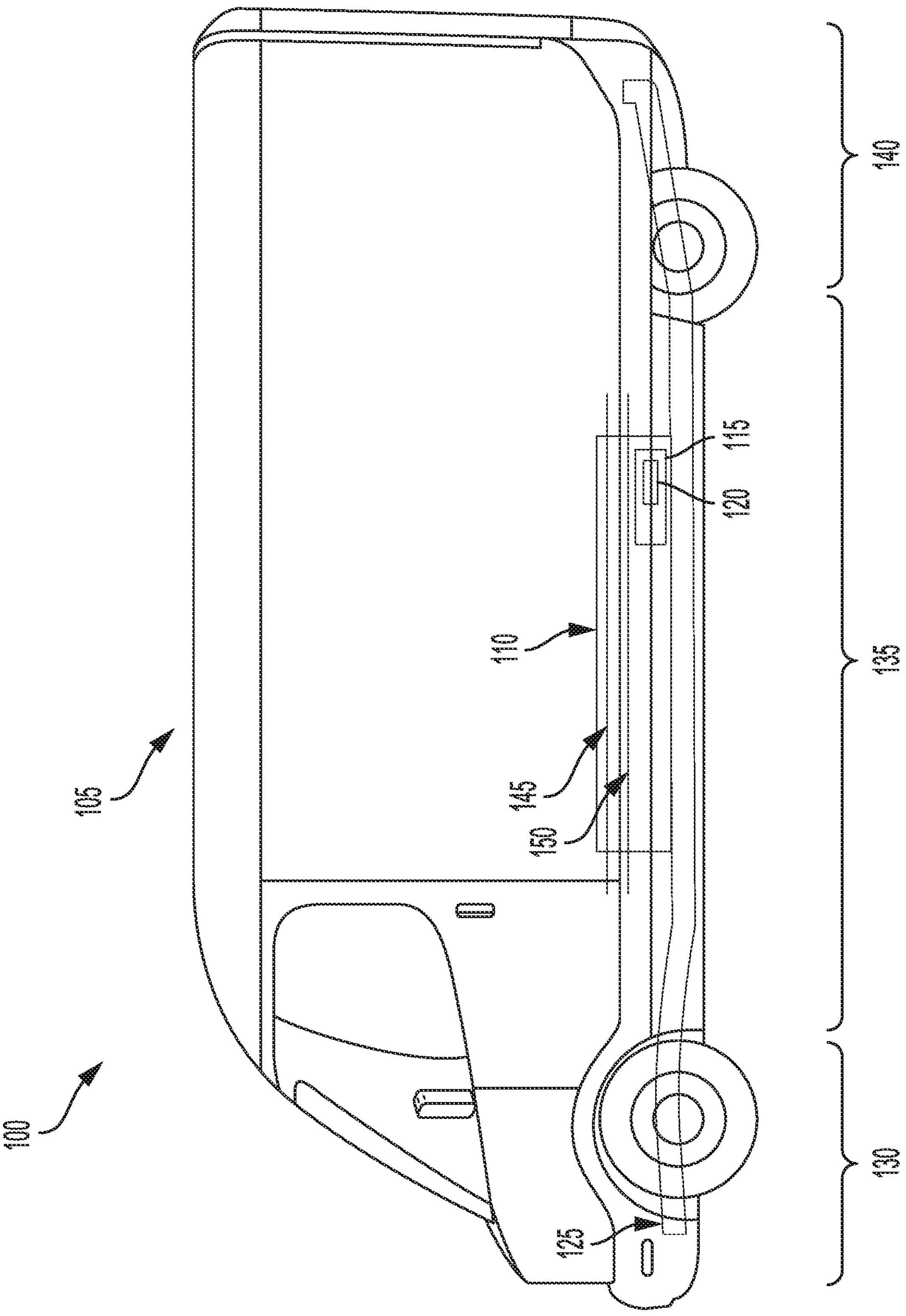
FIG. 1 depicts a side view of an example electric vehicle, in accordance with some aspects.

Following below are more detailed descriptions of various concepts related to, and implementations of, methods, apparatuses, and systems of a vehicle door and door control mechanism. The various concepts introduced above and discussed in greater detail below may be implemented in any of numerous ways.

The present disclosure is generally directed to systems and methods for using a spacer to convert a door control mechanism (e.g., an opening and closing mechanism) of a vehicle door from a manual mechanism to a power (e.g., automatic) mechanism, and vice versa. The disclosed solutions have a technical advantage of using the same door control mechanism for both manual and power actuation of a door. Instead of having to manufacture and install different parts based on the desired system, a single vehicle can switch between manual and power controlled doors by using the same system with the addition or removal of only a couple elements. For example, a vehicle can include a door control mechanism that opens and closes when subjected to manual forces (e.g., a person applies a force to a door handle). To switch the door control mechanism to a power mechanism, a spacer can be inserted into the door control mechanism to prevent various components of the mechanism from moving and to deactivate other components, which can prevent a user from moving the door handle to open the door and allow an electrical power input to control the door. In such a state, the door control mechanism can be electrically controlled such that the door opens and closes based on receiving the electrical power input.

The disclosed solutions can include at least one spacer. The spacer can be disposed in a cavity of a door control mechanism. The spacer can include at least one stopper configured to prevent motion of a component of the door control mechanism. The component can be associated with a door handle. For example, in a manual mode, movement of the door handle can cause movement of an actuation block. Movement of the actuator block can move a lever, which can cause a releasing mechanism (e.g., a latch, hook, lock) to become unlatched and enable the door to open. When the spacer is inserted into the cavity of the door control mechanism, the spacer can prevent the actuator block from moving. When the actuator block cannot move, the door handle can be prevented from moving. The spacer can also deactivate the releasing mechanism such that movement and positioning of the door can be controlled by use of electrical power.

The disclosed solutions have a technical advantage of using the same door control mechanism for actuating a door by both manual force and electrical power. This can enable a vehicle, for example, to incorporate both manual and electrical power capabilities by installing a single system. The single system can switch between the manual and power operating modes by inserting or removing only a couple components, for example. This can reduce manufacturing and assembly costs by reducing tooling cost, number of components that are to be installed in the vehicle, and time spent installing the system into the vehicle, among others. Switching between operating modes can also be performed by anyone and cannot require special training or expertise.

FIG. 1 depicts is an example cross-sectional view 100 of a vehicle 105. The vehicle 105 can include an electric vehicle installed with at least one battery pack 110. Vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery pack 110 may also be used as an energy storage system to power a building, such as a residential home or commercial building. Vehicles 105 can be fully electric or partially electric (e.g., plug-in hybrid) and further, vehicles 105 can be fully autonomous, partially autonomous, or unmanned. Vehicles 105 can also be human operated or non-autonomous. Vehicles 105 such as electric trucks or automobiles can include on-board battery packs 110, battery modules 115, or battery cells 120 to power the electric vehicles. The vehicle 105 can include a chassis 125 (e.g., a frame, internal frame, or support structure). The chassis 125 can support various components of the vehicle 105. The chassis 125 can span a front portion 130 (e.g., a hood or bonnet portion), a body portion 135, and a rear portion 140 (e.g., a trunk, payload, or boot portion) of the vehicle 105. The battery pack 110 can be installed or placed within the vehicle 105. For example, the battery pack 110 can be installed on the chassis 125 of the vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the vehicle 105 to provide electrical power to various systems or components of the electric vehicle 105.

Vehicle 105 can include at least one door 155. The door 155 can, for example, provide access to an internal compartment of the vehicle 105. The door 155 can be an external door 155. For example, an external door 155 can provide access to an internal compartment of the vehicle 105 from outside the vehicle 105. For example, the external door 155 can provide access for a person to enter or exit the vehicle 105. The door 155 can be an internal door 155. For example, the internal door 155 can provide access to an internal compartment of the vehicle 105 from another internal compartment of the vehicle 105. For example, an internal door 155 can define a passage between a passenger space of the vehicle 105 and a cargo space of the vehicle 105. The door 155 can have a door handle 160. The door handle 160 can facilitate manual control (e.g., opening and closing) of the door 155. For example, a person can apply a force to the handle to open or close the door 155. The door handle 160 can be disposed on an interior of the vehicle 105 or on an exterior of the vehicle 105.

Figure 2:
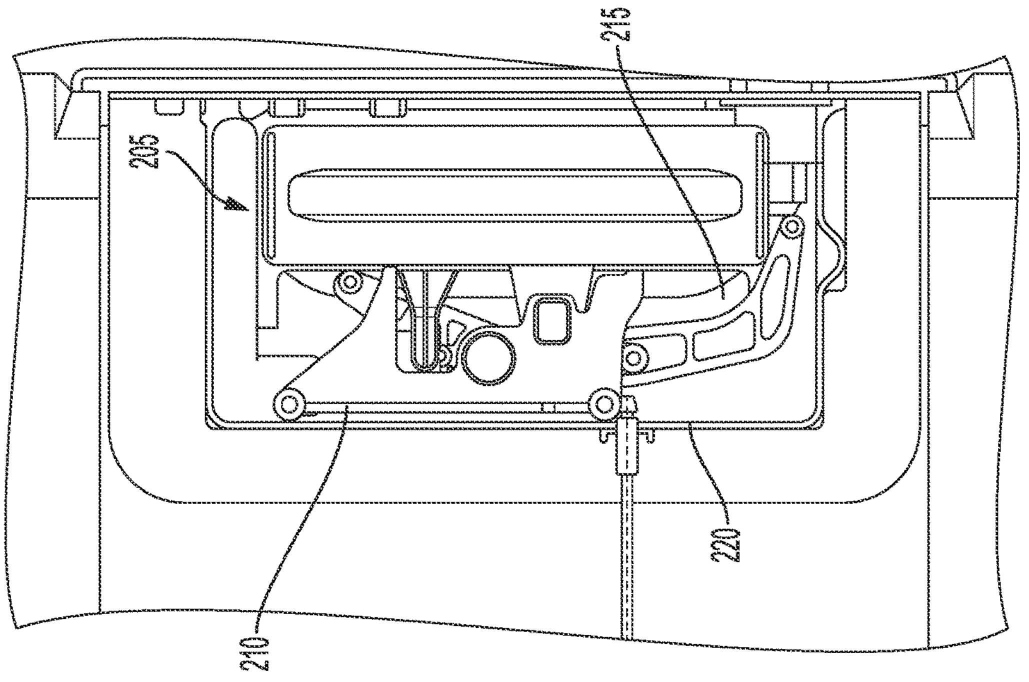
FIG. 2 depicts a front view of an example apparatus, in accordance with some aspects.

FIG. 2 depicts an example apparatus 200. The apparatus 200 can include at least one door control mechanism 205 and at least one spacer 210. The door control mechanism 205 can be coupled with a door 155 of a vehicle (e.g., vehicle 105, another electric vehicle, a non-electric vehicle). The door control mechanism 205 can be used with any door 155. For example, the door control mechanism 205 can be a left-handed or right-handed. The door control mechanism 205 can control the door 155. For example, the door control mechanism 205 can maintain a door 155 in an open or closed position. The door control mechanism 205 can facilitate moving the door 155 from a first position to a second position. For example, the door control mechanism 205 can facilitate moving the door 155 from a closed position to an open position and vice versa. The door control mechanism 205 can also move the door 155 from a first open position (e.g., halfway open) to a second open position (e.g., fully open).

The door control mechanism 205 can be manually operated. For example, a manual force can be applied to the door control mechanism 205 (e.g., via a door handle 160) to actuate the door control mechanism 205. Actuation of the door control mechanism 205 can initiate movement of the door 155 from a first position to a second position. The manual force can also lock the door 155 in a position. For example, the manual force can move the door 155 to a predetermined position (e.g., the second position). When the door 155 reaches the second position, the door control mechanism 205 can hold the door 155 in the predetermined position via a releasing mechanism.

The door control mechanism 205 can be power operated. For example, electrical power can be applied to the door control mechanism 205 to actuate the door control mechanism. For example, based on a press of a button, detecting a motion, or another actuation event, power can be sent or applied to the door control mechanism 205 to initiate movement of the door 155 from a first position to a second position. The power can also lock the door 155 in a position. For example, the power can move the door 155 to a second position and keep the door 155 in the second position.

The door control mechanism 205 can define at least one cavity 215. For example, the door control mechanism 205 can include a perimeter wall 220 that defines the cavity 215. The cavity 215 can retain or receive various components of the door control mechanism 205 (e.g., levers, linkages, connection points, locating features, tracks). The cavity 215 can also retain or receive the spacer 210. The spacer 210 can be disposed in the cavity 215. The spacer 210 can convert the door control mechanism 205 from being manually operated to power operated, and vice versa. For example, the door control mechanism 205 can be activated via a manual force when the spacer 210 is not disposed in the cavity 215. For example, a manual force applied to a door handle 160 can cause at least one component of the door control mechanism to move to facilitate movement of the door 155 from a first position to a second position. When the spacer 210 is disposed in the cavity 215, the door control mechanism 205 cannot be activated by the manual force. For example, the spacer 210 can interface with the at least one component of the door control mechanism 205. The interaction between the component and the spacer 210 can prevent the manual force from moving the component of the door control mechanism 205, which can prevent manual actuation of the door control mechanism 205 and the door 155 from moving from the first position to the second position.

Figure 3A:
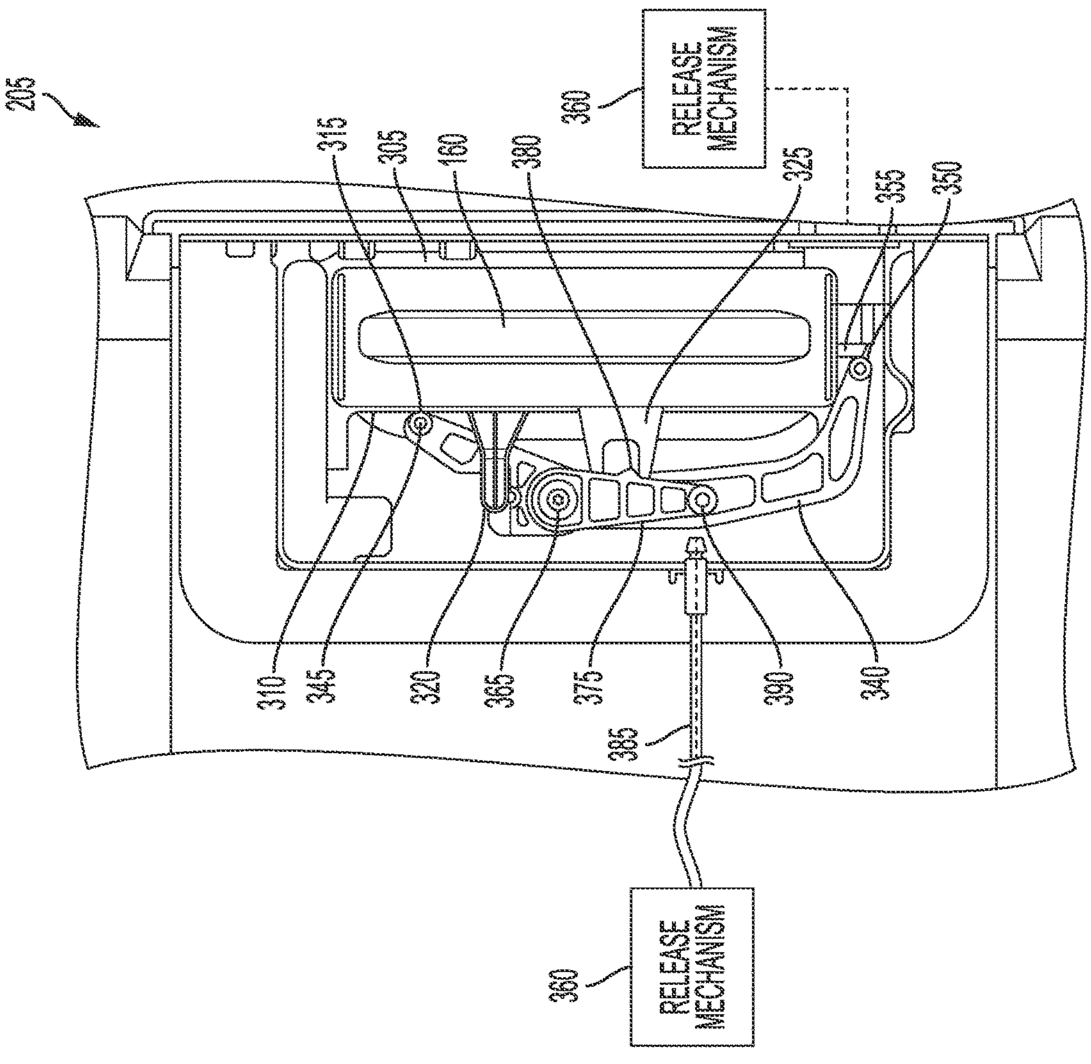
FIG. 3A depicts a front view of an example door control mechanism, in accordance with some aspects.
Figure 3B:
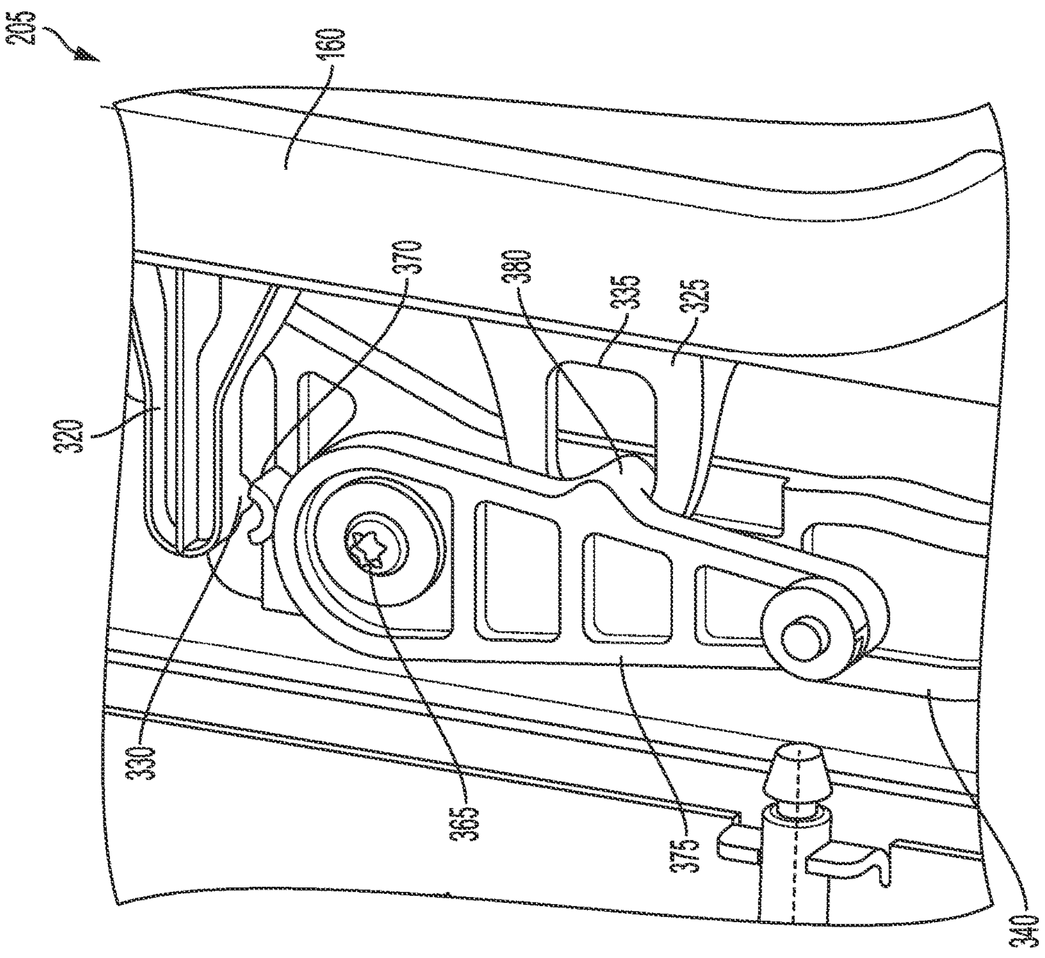
FIG. 3B depicts a front perspective view of a portion of an example door control mechanism, in accordance with some aspects.
Figure 3C:
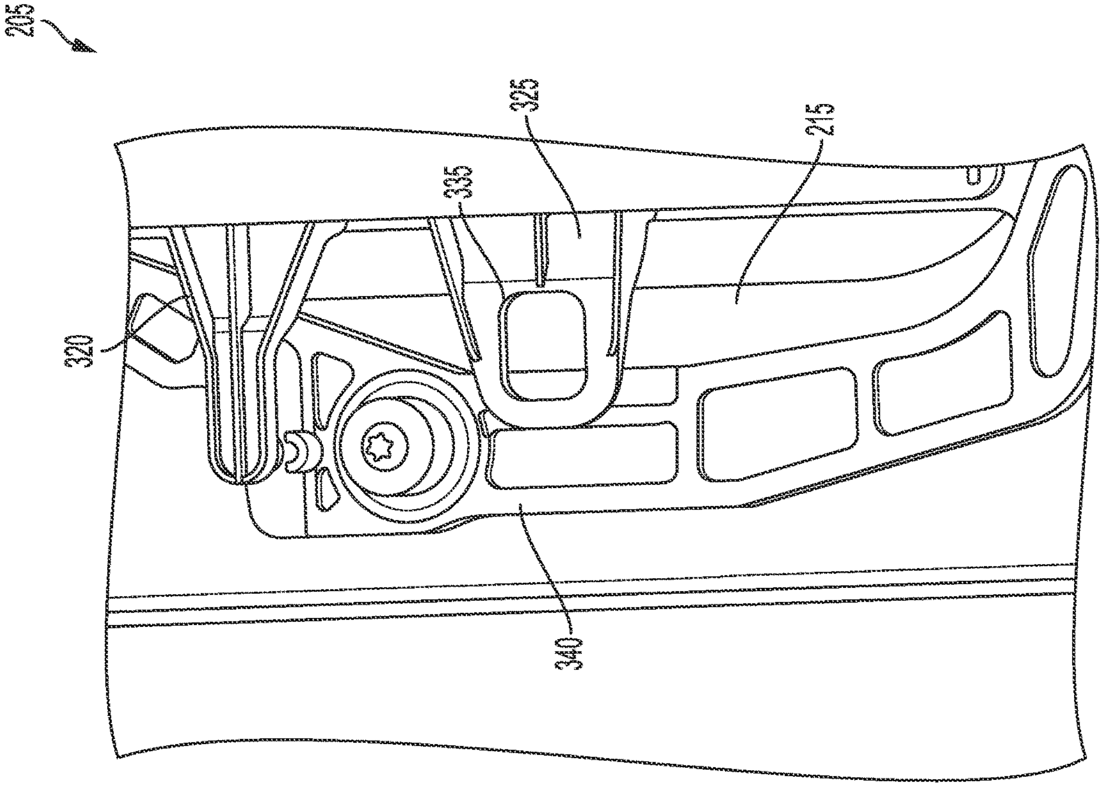
FIG. 3C depicts a front view of a portion of an example door control mechanism, in accordance with some aspects.

FIGS. 3A-3C depict an example door control mechanism 205. The door control mechanism 205 can include a door handle 160. The door handle 160 can receive a manual force to move the door handle 160 to actuate the door control mechanism 205. The door handle 160 can be any type of handle capable of actuating the door control mechanism 205. For example, the door can slide horizontally (e.g., left and right) to open and close a door 155. The door control mechanism 205 can include an actuator body 305. The actuator body 305 can be coupled to or integral with the door handle 160. The actuator body 305 can move based on a movement of the door handle 160. For example, if the door handle 160 moves to the right, the actuator body 305 can move to the right. The actuator body 305, or projections thereof, can interface with other components of the door control mechanism 205 to activate or trigger various release mechanisms to facilitate movement of the door 155 from a first positon to a second position and securing of the door 155 in the second position. For example, motion of the actuator body 305 can unlatch a latch to facilitate at least one of opening and closing a door 155.

The actuator body 305 can include at least one contact surface 310. The contact surface 310 can be a side surface of the actuator body 305. The contact surface 310 can interface with at least one other component of the door control mechanism 205 or at least one component of the spacer 210. A location along the contact surface 310 where a component of the door control mechanism 205 or a component of the spacer 210 interfaces with the contact surface can be a contact point 315. The contact surface 310 can have a plurality of contact points 315.

The actuator body 305 can have at least one projection. For example, the actuator body 305 can include a first projection, shown as lever projection 320, and a second projection, shown as linkage projection 325. The projections 320, 325 can extend from the contact surface 310 of the actuator body 305 into the cavity 215 of the door control mechanism 205. The lever projection 320 can include a projection pin 330. The projection pin 330 can extend from a surface of the lever projection 320. The projection pin 330 can interface with at least one other component of the door control mechanism 205 or a component of the spacer 210. The linkage projection 325 can define an aperture 335. The aperture 335 can receive at least one other component of the door control mechanism 205 or a component of the spacer 210.

The door control mechanism 205 can include a first member, shown as lever 340. Lever 340 can be disposed in the cavity 215. The lever 340 can include a lever pin 345. For example, the lever pin 345 can extend away from the lever 340. The lever pin 345 can be disposed at a first end of the lever 340. The lever pin 345 can interface with the actuator body 305 at a contact point 315 of the contact surface 310. The lever 340 can include a plunger 350. For example, the plunger 350 can extend away from the lever 340. The plunger 350 can be disposed at a second end of the lever 340. The plunger 350 can contact a switch 355. The switch 355 can trigger a release mechanism 360. The release mechanism 360 can be a first release mechanism 360. For example, activation of the switch 355 can deactivate or unlock a latch of the release mechanism 360 so the door 155 is no longer fixed in a first position and can move from the first position to a second position. Rotation of the lever 340 and activation of the switch 355 can facilitate opening of a door 155 coupled with the door control mechanism 205.

The lever 340 can rotate around a pivot 365. For example, when a manual force is applied to the door handle 160 in a direction toward the lever 340 (e.g., to the left), the actuator body 305 can contact the lever pin 345 and push the lever pin 345 to the left. Movement of the lever pin 345 to the left can cause the lever 340 to rotate about the pivot 365. The pivot 365 can be a projection disposed within the cavity 215 that can extend through an opening on the lever 340 to define a pivot point for the lever 340. Rotation about the pivot 365 can cause the plunger 350 to contact the switch 355 and trigger the release mechanism 360. Activation of the release mechanism 360 can facilitate movement of the door 155 from the first position to the second position. For example, activation of the release mechanism 350 can facilitate opening of the door 155.

The lever 340 can include a lever pocket 370. The lever pocket 370 can be disposed at a top end of the lever 340. The lever pocket 370 can be configured to receive the projection pin 330. Receipt of the projection pin 330 in the lever pocket 370 can provide the handle 160 and the actuator body 305 control over the lever 340. For example, the lever pocket 370 can surround at least a portion of the projection pin 330 (e.g., both the left and right side of the projection pin 330). A movement of the actuator body 305 to the left can cause the projection pin 330 to move to the left, which can cause the lever pocket 370 to move to the left and rotate the lever 340 about the pivot 365. A movement of the actuator body 305 to the right can cause the projection pin 330 to move to the right, which can cause the lever pocket 370 to move to the right and rotate the lever 340 to the right.

The door control mechanism 205 can include a second member, shown as linkage 375. The linkage 375 can be disposed in the cavity 215. The linkage 375 can include a linkage pin 380. The linkage pin 380 can extend away from the linkage 375. The linkage pin 380 can be disposed on a side of the linkage 375. The linkage pin 380 can be disposed in the aperture 335 of the linkage projection 325. The linkage pin 380 can be configured to interface with a wall defining the aperture 335. For example, the door handle 160 can be forced to the right (e.g., away from the cavity 215), which can cause the actuator body 305 and the linkage projection 325 to move to the right. When moving to the right, the linkage projection 325 can engage the linkage 375 by the wall defining the aperture 335 interfacing with the linkage pin 380 and causing the linkage pin 380 to move to the right. The linkage 375 can also be rotatably coupled at the pivot 365. For example, a top of the linkage 375 can be disposed around the pivot 365 to rotate around the pivot 365. When the linkage pin 380 moves to the right, the linkage pin 380 can cause the linkage 375 to rotate around the pivot 365.

The door control mechanism 205 can include a cable 385. The cable 385 can be coupled with a second release mechanism 360. The second release mechanism 360 can be the same type or a different type of release mechanism than the first release mechanism. Pulling the cable 385 can deactivate or unlock a second latch of the second release mechanism 360 so the door 155 can move from a first position to a second position. The linkage 375 can have a cable connection point 390. The cable connection point 390 can be disposed at a bottom of the linkage 375. Rotation of the linkage 375 can pull the cable 385 which can deactivate or unlock the second latch of the second release mechanism 360. Rotation of the linkage 375 can be independent from the rotation of the lever 340. Movement of the linkage pin 380 to the right can cause the cable 385 to be pulled to the right and trigger the second release mechanism 360. Activation of the second release mechanism 360 can facilitate movement of the door 155 from the first position to the second position. For example, activation of the second release mechanism 360 can facilitate closing of the door 155.

Figure 4:
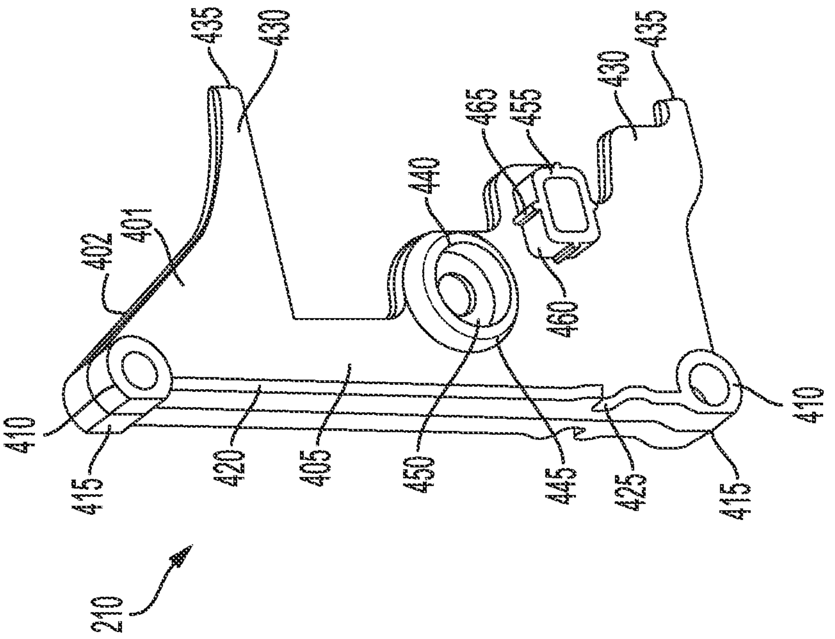
FIG. 4 depicts a front perspective view of a spacer, in accordance with some aspects.

FIG. 4 depicts a first side 401 of an example spacer 210. The spacer 210 can be disposed in the cavity 215 of the door control mechanism 205. The spacer 210 can convert a manually-operated door control mechanism 205 to a power-operated door control mechanism 205. For example, the door control mechanism 205 can actuate in response to a manual force with the spacer 210 not disposed in the cavity 215 and can actuate in response to an electrical power input with the spacer 210 disposed in the cavity 215. For example, the spacer 210 can inhibit motion of components of the door control mechanism 205 that is caused by a manual force when the spacer 210 is disposed in the cavity 215 of the door control mechanism 205. With the spacer 210 disposed in the cavity 315, a release mechanism 360 of the door control mechanism 205 can be deactivated or disengaged such that power can be used to maintain a position of the door 155 instead of a mechanical latch or other mechanical mechanism. With the spacer 210 not in the cavity 215, the door control mechanism 205 can actuate the door. With the spacer 210 not in the cavity 215, at least one mechanical release mechanism can be engaged such that the door 155 cannot be released via an electrical input.

The spacer 210 can have a first side 401 and a second side 402. The first side 401 can mirror the second side 402 such that the first side 401 and the second side 402 can be interchangeable. For example, the spacer 210 can be disposed in a cavity of a left-handed door control mechanism 205 or a right-handed door control mechanism 205. In the left-handed door control mechanism 205, the first side 401 can be a front side (e.g., facing away from the cavity 215) and the second side 402 can be a back side (e.g., facing toward the cavity 215). In the right-handed door control mechanism 205, the first side 401 can be the back side and the second side 402 can be the front side.

The spacer 210 can include at least one spacer body 405. The spacer body 405 can include at least one locating feature 410. The locating feature 410 can facilitate proper placement of the spacer 210 within the cavity 215. The locating feature 410 can prevent the spacer 210 from moving within the cavity 215. For example, the locating feature 410 can be or can include an aperture to receive a corresponding component of the door control mechanism 205. For example, the corresponding component can be a pin, a post, or any other projection this fixed within the door control mechanism 205. The locating features 410 can keep the spacer 210 stationary within the cavity 215. For example, if a force is applied to the spacer 210, the spacer cannot move, or only minimally move, within the cavity 215 to remain in the same or substantially the same location and maintain the same or substantially the same orientation.

The spacer 210 can include a plurality of locating features 410. For example, the spacer 210 can include a first locating feature 410 and a second locating feature 410. The first locating feature 410 can be disposed at a first end (e.g., top end) of the spacer 210 and the second locating feature 410 can be disposed at a second end (e.g., bottom end) of the spacer 210. Each locating feature 410 can receive a corresponding component of the door control mechanism 205. The spacer 210 can include any number of locating features 410 and the locating features 410 can be located at any location of the spacer 210.

The locating feature 410 can have an interfacing surface 415. The interfacing surface 415 can be a planar (e.g., flat, level, straight) surface. The interfacing surface 415 can interface with the perimeter wall 220 of the door control mechanism 205. The interaction between the interfacing surface 415 and the perimeter wall 220 can facilitate keeping the spacer 210 stationary to prevent motion of other components of the door control mechanism 205. For example, the perimeter wall 220 can prevent the spacer 210 from moving left when a force is applied.

The spacer 210 can include a ridge 420. The ridge 420 can be coupled with or integral with the spacer body 405. The ridge 420 can define a side of the spacer 210. The ridge 420 can extend from the first side 401 of the spacer body 405. For example, the ridge 420 can extend perpendicular from the spacer body 405. The ridge 420 can be configured to interface with the perimeter wall 220 of the door control mechanism 205 or can be configured to be offset from the perimeter wall 220 when the spacer 210 is disposed in the cavity 215. The ridge 420 can define a pocket 425. For example, the pocket 425 can be a recess, a cut-out, an indent, or a slot. The pocket 425 can receive a portion of the cable 385 to facilitate disengagement of a mechanical release mechanism 360 such that the door control mechanism 205 can be power operated. For example, positioning the cable 385 in the pocket 425 can cause a latch to remain disengaged such that a door 155 can be free to be actuated by a power input.

The spacer 210 can include at least one stopper, shown as stopper arm 430. Stopper arm 430 can extend from the spacer body 405. The stopper arm 430 can prevent the door control mechanism 205 from actuating in response to a manual force. Stopper arm 430 can inhibit motion of at least one component of the door control mechanism 205. For example, stopper arm 430 can have a stopper surface 435.

For example, the stopper surface 435 can be at a tip of the stopper arm 430. The stopper surface 435 can interface with a contact point 315 of the actuator body 305. The interaction between the stopper surface 435 and the contact point 315 can inhibit motion of the actuator body 305. For example, the stopper arm 430 prevent the door handle 160 and the actuator body 305 from sliding in response to an applied manual force. For example, the stopper surface 435 can interface with the contact point 315 of actuator body 305 and prevent the actuator body 305 from moving toward the cavity 215 (e.g., to the left) when a manual force is applied to the door handle 160 of the door control mechanism 205. Preventing the actuator body 305 from moving can prevent the door handle 160 from moving. For example, without the spacer 210 disposed in the cavity 215, a manual force applied to the door handle 160 in a direction toward the cavity 215 can cause the actuator body 305 to move toward or into the cavity 215. The actuator body 305 can contact the lever pin 345 of the lever 340 and push the lever pin 345 to the left. With the spacer 210 disposed in the cavity 215, the stopper arm 430 can prevent the actuator body 305 from being able to move to the left, such that the lever pin 345 cannot be pushed to the left. The stopper arm 430 can prevent a door 155 coupled with the door control mechanism 205 from closing in response to a manual force.

The spacer 210 can have any number of stopper arms 430, or other projections, that contact the actuator body 305 and prevent the actuator body 305 from moving in a direction toward the cavity 215 when a manual force is applied to the door control mechanism 205. For example, the spacer 210 can include a first stopper arm 430 and a second stopper arm 430. The first stopper arm 430 can extend from a top portion of the spacer body 405 and the second stopper arm 430 can extend from a bottom portion of the spacer body 405. The contact surface 310 of the actuator body 305 can include a first contact point 315 and a second contact point 315. The first stopper arm 430 can interface with the contact surface 310 of the actuator body 305 at the first contact point 315 and the second stopper arm 430 to interface with the contact surface 310 of the actuator body 305 at the second contact point 315. The first and second stopper arms 430 can, for example, prevent a door 155 coupled with the door control mechanism 205 from opening.

The spacer 210 can include at least one pivot opening 440. The pivot opening 440 can be another locating feature 410. The pivot opening 440 can extend through the spacer body 405. The pivot opening 440 can be disposed along the spacer body 405 to align with the pivot 365 of the door control mechanism 205 such that the pivot opening 440 can either receive the pivot 365 or be coupled with the pivot 365. For example, the pivot opening 440 can include a raised rim, shown as rim 445. The rim 445 can extend from the first side 401 of the spacer 210. The pivot opening 440 can include an interior shelf 450. The pivot 365 can be disposed within the rim 445 of the pivot opening 440. The pivot 365 can also be disposed in line with the pivot 365 but not within the pivot opening 440. A fastener (e.g., a screw or nail) can extend through the pivot opening 440 to couple the spacer 210 with the pivot 365. A head of the fastener can interface with (e.g., rest on, contact) the interior shelf 450.

The spacer 210 can include at least one stopper, shown as stopper extension 455. The stopper extension 455 can prevent the door control mechanism 205 from actuating in response to a manual force. Stopper extension 455 can extend from a surface (e.g., the first side 401) of the spacer 210. The stopper extension 455 can include at least one exterior wall 460. For example, the stopper extension 455 can have a rectangular shape and have four exterior walls 460. At least one of the exterior walls 460 can have at least one rib 465. For example, a rib 465 can be disposed proximate (+/−10%) a center of each of the four exterior walls 460. The stopper extension 455 can be disposed in the aperture 335 of the linkage projection 325. The exterior wall 460 (or the rib 465 of the exterior wall 460) can interface with the linkage projection 325 from within the aperture 335. For example, a left exterior wall 460 of the stopper extension 455 can interface with a first portion of the linkage projection 325 and prevent the actuator body 305 from moving away from the cavity 215 (e.g., to the right). The right exterior wall 460 of the stopper extension 455 can interface with a second portion of the linkage projection 325 and prevent the actuator body 305 from moving toward or into the cavity 215 (e.g., to the left). For example, the stopper extension 455 can prevent a door 155 coupled with the door control mechanism 205 from opening and closing in response to a manual force.

Figure 5:
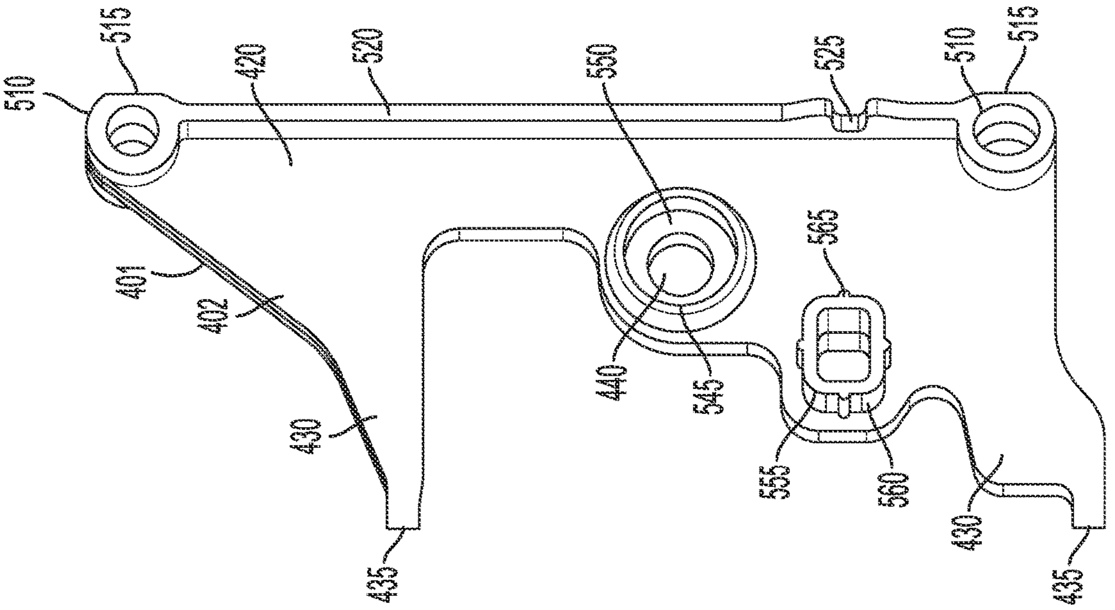
FIG. 5 depicts a rear perspective view of an example spacer, in accordance with some aspects.

FIG. 5 depicts a second side 402 an example spacer 210. The second side 402 can have more, less, or different features than the first side 401. The second side 402 can also have the same features as the first side 401. For example, the second side 402 of the spacer 210 can include at least one locating feature 510. The locating feature 510 can be the same or a mirror of locating feature 410. The locating feature 510 of the second side 402 can align with a locating feature 410 of the first side 401. The second side 410 can have the same number of locating features 510 as the first side 401. For example, the first side can have two first side locating features 410 and the second side 402 can have two second side locating features 510 aligned with the two first side locating features 410. The locating feature 510 can have an interfacing surface 515. The interfacing surface 515 can be integral with the interfacing surface 415.

The spacer 210 can have at least one ridge 520 that extends from the second side 402 of the spacer body 405. The ridge 520 of the second side 402 can be integral with the ridge 420 of the first side 401. The ridge 520 of the second side 402 can extend in a direction opposite that of the ridge 420 of the first side 401. The ridge 520 can define a pocket 525. The pocket 525 can align with the pocket 425.

The pivot opening 440 can extend through the spacer body 305 between the first side 401 and the second side 402. The second side 402 can include a rim 545 and an interior shelf 550.

The spacer 21 can have at least one stopper, shown as stopper extension 555. The stopper extension 555 can extend from the second side 402 of the spacer 210. The stopper extension 555 can include at least one exterior wall 560. An exterior wall 560 can include at least one rib 565.

The features of the first side 401 can mirror the features of the second side 402. For example, the corresponding features of the first side 401 and the second side 402 (e.g., stopper extension 455 and stopper extension 555) can mirror each other such that the corresponding features can be aligned and have similar shapes, sizes, and orientations. The mirroring of the features can facilitate applying the spacer 210 in a plurality of door control mechanisms 205. For example, the spacer 210 can be disposed in a cavity of a left-handed door control mechanism 205 or a right-handed door control mechanism 205.

A vehicle 105 can include the door control mechanism 205 and the spacer 210 as described herein. For example, the vehicle can include a door control mechanism 205 to control the positioning of a door 155 of the vehicle 105. The door control mechanism 205 can be used for both manual and automatic operation of the door 155. The door control mechanism can define a cavity 215. For example, the door control mechanism 205 can include a perimeter wall 220 that defines the cavity 215. The door control mechanism 205 can include an actuator body 305 coupled with or integral with a door handle 160 of the door 155. The actuator body 305 can include a contact surface 310. The actuator body 305 can include a first projection (e.g., lever projection 320). The actuator body 305 can include a second projection (e.g., linkage projection 325). The second projection can define an aperture 335. The door control mechanism 205 can include a first member and a second member. For example, the first member can be lever 340 and the second member can be linkage 375. The first and second members can be disposed in the cavity 215. The spacer 210 can be disposed in the cavity 215. The spacer 210 can include a spacer body 405. The spacer 210 can include a first stopper that extends from the spacer body 405. The first stopper can be stopper arm 430. The first stopper can interface with the actuator body 305 at a contact point 315.

The spacer 210 can include a second stopper. The second stopper can extend from a side 401, 402 of the spacer body 405. For example, the second stopper can be stopper extension 455, 555. The second stopper can interface with a projection of the actuator body 305. For example, the second stopper can interface with the linkage projection 325. At least one of the first stopper and the second stopper can prevent the door control mechanism 205 from actuating in response to a manual force. For example, the first stopper can prevent the actuator body 305 from moving, which can prevent the door handle 160 from moving in response to a manual force. The second stopper can prevent the linkage projection 325 from moving which can also prevent the door handle 160 from moving in response to a manual force.

Figure 6:
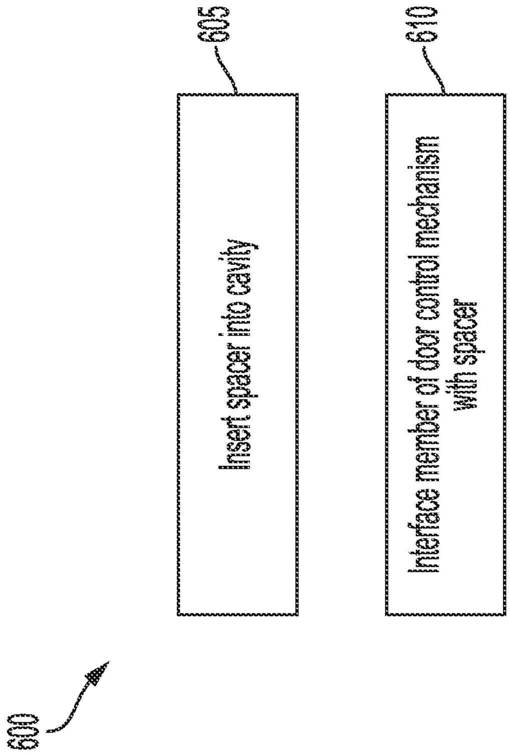
FIG. 6 depicts flow diagram illustrating an example method to convert a door control mechanism between a manually-operated mechanism and a power-operated mechanism, in accordance with some aspects.

FIG. 6 depicts an example method 600 to convert a door control mechanism 205 between a manually-operated mechanism and a power-operated mechanism. Method 600 can include inserting a spacer 210 into a cavity 215 (Act 605) and interfacing a component of the door control mechanism 205 with the spacer 210 (Act 610). Act 605 of inserting the spacer 210 into the cavity 215 can include a cavity 215 that is defined by the door control mechanism 205. The door control mechanism 205 can include an actuator body 305. The actuator body 305 can include a contact surface 310 and at least one projection (e.g., linkage projection 325). The spacer 210 can include at least one spacer body 405. The spacer body 405 can be disposed in the cavity 215. The spacer 210 can include at least one stopper. For example, the spacer 210 can include a first stopper and a second stopper. The first stopper can extend from the spacer body 405. For example, the first stopper can be stopper arm 415. The first stopper can interface with the contact surface 310 of the actuator body 305. For example, the first stopper can interface with actuator body 305 at a contact point 315. The second stopper can extend from a rear surface (e.g., the second side 402) of the spacer body 405. For example, the second stopper can be stopper projection 555. The second stopper can interface with a projection of the actuator body 305. For example, the second stopper can interface with the linkage projection 325.

Act 610 of interfacing the component of the door control mechanism 205 with the spacer 210 can include receiving a manual force. For example, a manual force can be applied to the door handle 160 of the door control mechanism 205. With the manual force, the member of the door control mechanism 205 can interface with at least one of the first stopper and the second stopper to prevent manual actuation of the door control mechanism 205. For example, the at least one of the first stopper and the second stopper can prevent the actuator body 305 from moving, which can prevent motion of the door handle 160 such that the manual force cannot actuate the door control mechanism 205.

The manual force can be applied in any direction. For example, the manual force can be applied in a first direction or a second direction. In response to receiving the manual force applied in the first direction, the first stopper can interface with the contact surface 310 of the actuator body 305. For example, the stopper arm 430 can interface with a contact point 315 of the contact surface 315. In response to receiving the manual force applied in the second direction, the second stopper of the spacer 210 can interface with the linkage projection 325.

Act 610 of interfacing the component of the door control mechanism 205 with the spacer 210 can include preventing a door 155 associated with the door control mechanism 205 from opening in response to a first manual force. For example, the contact surface 310 of the actuator body 305 can contact a stopper surface of the first stopper. For example, the contact surface 310 of the actuator body 305 can contact the stopper surface 435 of the stopper arm 430. Act 610 can also include preventing the door 155 associated with the door control mechanism 205 from closing in response to a second manual force. For example, a linkage projection 325 can contact the second stopper. For example, the linkage projection 325 can contact the stopper projection 555. The spacer 210 can prevent actuation of the door control mechanism 205 based on the door control mechanism 205 receiving a manual force. The spacer 210 can facilitate actuation of the door control mechanism 205 based on the door control mechanism 205 receiving an electoral power input.

Act 610 can also include inhibiting motion of a component of the door control mechanism, wherein the motion of the component facilitates at least one of opening a door 155 and closing the door 155. For example, motion of the lever 340 can unlatch a latch of a mechanical release mechanism 360 to facilitate opening the door 155. Inhibiting the actuator body 305 from moving such that the actuator body 305 cannot move the lever 340 can prevent the door control mechanism 205 from actuating in response to a manual force. Motion of the linkage 375 can unlatch a latch of a mechanical release mechanism 360 to facilitate closing the door 155. Inhibiting the actuator body 305 from moving such that the actuator body cannot move the linkage 375 can prevent the door control mechanism 205 from actuating in response to a manual force.

Method 600 can include disengaging a release mechanism 360 of the door control mechanism 205. For example, the release mechanism 360 can facilitate locking a door 155 in a position. For example, the release mechanism 360 can keep a door in a closed position or an open position. When the release mechanism 360 is disengaged, a latch (or other locking device) can be released such that electrical power can maintain a position of the door 155 rather than the release mechanism 360. With the release mechanism 360 disengaged, the door control mechanism can be actuated by an electrical power input.

Figure 7:
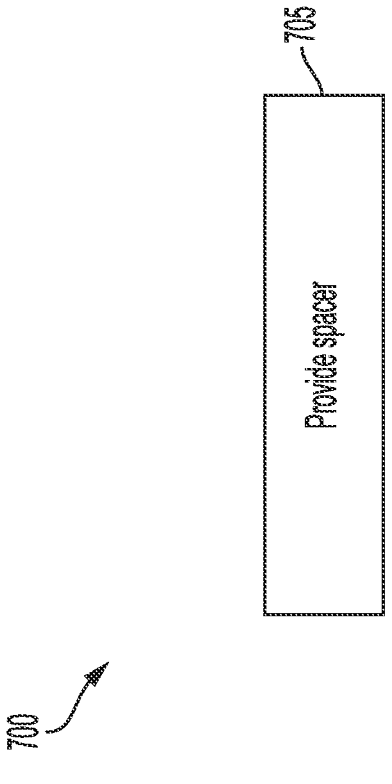
FIG. 7 depicts a flow diagram illustrating an example method to provide a spacer, in accordance with some aspects.

FIG. 7 depicts an example method 700 to provide a spacer 210. Method 700 can include providing a spacer 210 (Act 705). The spacer 210 can include a spacer body 405. The spacer 210 can include a first stopper and a second stopper. The first stopper can extend from the spacer body 405. The first stopper can interface with a first component of a door control mechanism 205. For example, the first stopper can be a stopper arm 430 and the first component can be a contact surface 310 of an actuator body 305. The stopper arm 430 can have a stopper surface 435. The stopper surface 435 of the stopper arm 415 can interface with contact point 315 of the contact surface 310. The second stopper can extend from a rear surface of the spacer body 405. The second stopper can interface with a second component of the door control mechanism 205. For example, the second stopper can be the stopper projection 555 and the second component can be the linkage projection 325. At least one of the first stopper and the second stopper can prevent the door control mechanism 205 from actuating in response to a manual force.

Some of the description herein emphasizes the structural independence of the aspects of the system components or groupings of operations and responsibilities of these system components. Other groupings that execute similar overall operations are within the scope of the present application. The systems described above can provide multiple ones of any or each of those components and these components can be provided on either a standalone system or on multiple instantiation in a distributed system.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, and orientations can occur without materially departing from the teachings and advantages of the subject matter disclosed herein. For example, elements shown as integrally formed can be constructed of multiple parts or elements, the position of elements can be reversed or otherwise varied, the nature or number of discrete elements or positions can be altered or varied, and the orientation of elements or components can be varied. Other substitutions, modifications, changes and omissions can also be made in the design, operating conditions and arrangement of the disclosed elements and operations without departing from the scope of the present disclosure.

For example, relative parallel, perpendicular, vertical or other positioning or orientation descriptions include variations within +/−10% or +/−10 degrees of pure vertical, parallel or perpendicular positioning. References to directions or orientations such as left, right front, back, horizontal, vertical, and others can be made with reference to the figures and can vary based on the actual orientation of the components. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:

a door control mechanism that defines a cavity, the door control mechanism comprising:

an actuator body comprising a contact surface; and a projection that extends from the actuator body into the cavity; and a spacer to be disposed in the cavity, the spacer comprising:
a spacer body;
a first stopper that extends from the spacer body, the first stopper to interface with the contact surface of the actuator body, and the first stopper configured to prevent a door, coupled with the door control mechanism, from opening in response to a manual force; and
a second stopper that extends from a surface of the spacer body, the second stopper to interface with the projection of the door control mechanism, and the second stopper to prevent the door control mechanism from actuating in response to the manual force.

2. The apparatus of claim 1, comprising:
the first stopper comprising a stopper arm that extends from the spacer body, the stopper arm to inhibit motion of the actuator body of the door control mechanism, wherein the motion of the actuator body unlatches a latch to facilitate at least one of opening the door and closing the door.

3. The apparatus of claim 1, comprising:
the second stopper configured to prevent the door from closing in response to the manual force.

4. The apparatus of claim 1, comprising:
the projection of the door control mechanism defining an aperture; and
the second stopper to be disposed within the aperture, the second stopper to prevent the door coupled with the door control mechanism from opening and closing in response to the manual force.

5. The apparatus of claim 1, comprising:
the spacer comprising a first side and a second side, the first side mirroring the second side such that the spacer can be disposed in a left-handed door control mechanism or a right-handed door control mechanism.

6. The apparatus of claim 1, comprising:
the spacer comprising a plurality of locating features, the plurality of locating features comprising a first locating feature and a second locating feature, the first locating feature disposed at a first end of the spacer and the second locating feature disposed at a second end of the spacer, the first locating feature and the second locating feature to keep the spacer stationary within the cavity.

7. The apparatus of claim 1, comprising:
the spacer comprising a pocket, the pocket to receive a portion of a cable to facilitate disengagement of a mechanical release mechanism such that the door control mechanism can be power operated.

8. The apparatus of claim 1, comprising:
the contact surface of the actuator body comprising a first contact point and a second contact point; and
the spacer comprising a third stopper that extends from the spacer body, the first stopper to interface with the contact surface at the first contact point and the third stopper to interface with the contact surface at the second contact point, the first stopper and the third stopper to prevent the door coupled with the door control mechanism from opening.

9. The apparatus of claim 1, wherein the door control mechanism actuates in response to the manual force with the spacer not disposed in the cavity and actuates in response to an electrical power input with the spacer disposed in the cavity.

10. A system, comprising:
a door control mechanism to couple with a door, the door control mechanism defining a cavity, the door control mechanism comprising:
an actuator body comprising a contact surface; and
a projection that extends from the actuator body into the cavity; and
a spacer to be disposed in the cavity, the spacer to prevent manual actuation of the door control mechanism, the spacer comprising:
a spacer body;
a first stopper extending from the spacer body, the first stopper configured to interface with the contact surface, and the first stopper configured to prevent the door from opening in response to a manual force; and
a second stopper that extends from a surface of the spacer body, the second stopper to interface with the projection of the door control mechanism.

11. The system of claim 10, comprising:
the first stopper comprising a stopper arm extending from the spacer body, the stopper arm comprising a stopper surface, the stopper surface to interface with the contact surface when the manual force is applied to the door control mechanism.

12. The system of claim 10, comprising:
the projection of the door control mechanism defining an aperture.

13. The system of claim 10, wherein the door control mechanism actuates in response to the manual force when the spacer is not in the cavity and actuates in response to an electrical power input when the spacer is in the cavity.

* * * * *